(12) United States Patent
Nock

(10) Patent No.: US 8,011,856 B2
(45) Date of Patent: Sep. 6, 2011

(54) CONSTANT THRUST RESTRAINT OF PIPELINE WALKING

(76) Inventor: Mendel Nock, Houston, TX (US)

( * ) Notice: Subject to any disclaimer, the term of this patent is extended or adjusted under 35 U.S.C. 154(b) by 0 days.

(21) Appl. No.: 11/891,241

(22) Filed: Aug. 10, 2007

(65) Prior Publication Data
US 2009/0041547 A1     Feb. 12, 2009

(51) Int. Cl.
*F16L 3/00* (2006.01)
(52) U.S. Cl. .................... 405/184.4; 248/571
(58) Field of Classification Search .............. 405/184.4, 405/172, 224; 284/571
See application file for complete search history.

(56) References Cited

U.S. PATENT DOCUMENTS

| | | | | |
|---|---|---|---|---|
| 2,225,515 A * | 12/1940 | Wood | ............................ | 248/571 |
| 2,609,192 A * | 9/1952 | Lermont | ....................... | 267/156 |
| 3,539,136 A * | 11/1970 | Suozzo | ......................... | 248/543 |
| 3,848,639 A * | 11/1974 | Chen | ............................. | 138/103 |
| 3,895,788 A * | 7/1975 | Liesegang | ....................... | 267/70 |
| 4,252,466 A * | 2/1981 | Berti et al. | ..................... | 405/172 |
| 4,301,989 A * | 11/1981 | Kallenbach | .................... | 248/548 |
| 4,304,387 A * | 12/1981 | Pischzik et al. | ............... | 248/571 |
| 4,387,886 A * | 6/1983 | Schlegel et al. | ................. | 269/71 |
| 4,566,680 A * | 1/1986 | Schlegel et al. | ................. | 269/74 |
| 4,669,584 A * | 6/1987 | Santos | ......................... | 188/134 |
| 5,018,700 A * | 5/1991 | Hardtke | ........................ | 248/571 |
| 5,263,796 A * | 11/1993 | de Waal | ........................ | 405/172 |
| 5,290,127 A * | 3/1994 | Foster et al. | .................. | 405/172 |
| 5,462,246 A * | 10/1995 | Schlenker | ....................... | 248/49 |
| 5,934,423 A * | 8/1999 | Kallenbach | .................... | 188/374 |
| 6,817,808 B1 * | 11/2004 | Patinet | .......................... | 405/170 |
| 7,246,971 B1 * | 7/2007 | Ellis et al. | .................. | 405/168.1 |
| 7,293,755 B2 * | 11/2007 | Miyahara et al. | ............. | 248/562 |

* cited by examiner

*Primary Examiner* — Tara Mayo-Pinnock
(74) *Attorney, Agent, or Firm* — Buskop Law Group, PC; Wendy Buskop

(57) ABSTRACT

The invention is a means to eliminate thermal or pressure walking of a pipeline by applying a constant axial force to the pipeline through the interposition of a constant-thrust device between a point fixed to the pipeline and a point on a foundation, which pair of points are otherwise unconstrained relative to each other in the longitudinal direction of the pipeline.

3 Claims, 4 Drawing Sheets

CONSTANT THRUST RESTRAINT OF PIPELINE WALKING

CROSS-REFERENCE TO RELATED APPLICATIONS

N/A

STATEMENT REGARDING FEDERALLY SPONSORED RESEARCH OR DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

High-temperature and/or high-pressure subsea pipelines sometimes exhibit the phenomenon of thermal walking, also called crawling or ratcheting. It is axial shifting of short pipelines due to the passage of a thermal transient, usually during start-up of flow, or due to another asymmetric load in combination with pipeline heating. Behavior of a pipeline as a short pipeline is a function of whether soil resistance or friction builds-up sufficiently to restrain longitudinal motion, or is too small to prevent overall movement. Walking usually proceeds from the end where the hot fluid is introduced towards where it flows. Other factors that influence the direction of walking are the slope of the sea bottom and the application of external axial loads such as bottom tension at the touchdown point of a catenary riser.

In deep water, pipelines typically terminate with a Pipeline End Termination (PLET), a structure that allows connection of the pipeline to subsea structures such as manifolds or trees, or to other pipelines. The PLET structure includes a foundation that vertically supports the pipeline end and the weight of one or more end connectors, and any valves present. This foundation is usually a shallow foundation such as a mudmat that is compatible with the pipelay process. The foundation also provides resistance to horizontal loads, but this resistance is usually relatively small compared with the thrust from the pipeline due to walking or to thermal expansion if that expansion were restrained. A PLET also may include a hook or yoke to facilitate installation from a pipelay vessel or recovery for repairs. A PLET often includes a sliding mechanism that allows pipeline expansion to occur due to temperature and pressure changes without shifting the foundation.

Less commonly, a valve or a means for tie-in of other facilities is provided at locations other than the pipeline ends. When the valve or tie-in is along the pipeline route the structure is referred to as an inline sled. On some pipelines there is a riser base to allow connection of a top-tensioned riser, or to isolate a catenary riser from the remainder of the pipeline for testing or maintenance. A foundation mat to support the weight of these components is required, however normally there is no sliding mechanism between the pipeline and foundation.

In shallow water, walking may be restrained by rock dumping, but in deep water such methods have been impractical. Instead, anchors, usually suction piles, provide the restraint to longitudinal movement. These anchors may also serve as an aid to pipeline installation. In most cases, the piles have been located at one end of the pipeline segment, the higher or predicted hot end, however there have also been designs with the pile near the middle of the pipeline. Fixing the pipeline near the middle of the pipeline typically requires significantly less pile capacity than fixing the end.

The member connecting the pipeline to the pile has historically been chosen to apply tension to the pipeline at that location both for ease in handling and to avoid buckling the pipeline there, especially when at the pipeline ends.

Piles incur significant cost both in terms of fabrication onshore and installation offshore. In addition, they constrain the subsea architecture and congest the environs around subsea trees and manifolds.

The load required to prevent motion through a constant application of force is much less than the maximum incurred by rigidly fixing either an end or the midpoint. For very short lines, the reduction may be enough to allow the PLET, in-line sled, riser-base, or purposely-added mud mat foundation to resist the pipeline horizontal load on its own without any piles. For other lengths, the reduction in pile load may reduce cost for the pile and for its installation.

BRIEF SUMMARY OF THE INVENTION

The invention is the interposition of a subsea constant-thrust (CT) device between a point on a pipeline and a foundation capable of resisting horizontal load. Its purpose is to eliminate thermal walking while reducing horizontal loading to the foundation.

DETAILED DESCRIPTION OF THE INVENTION

Figure 1:
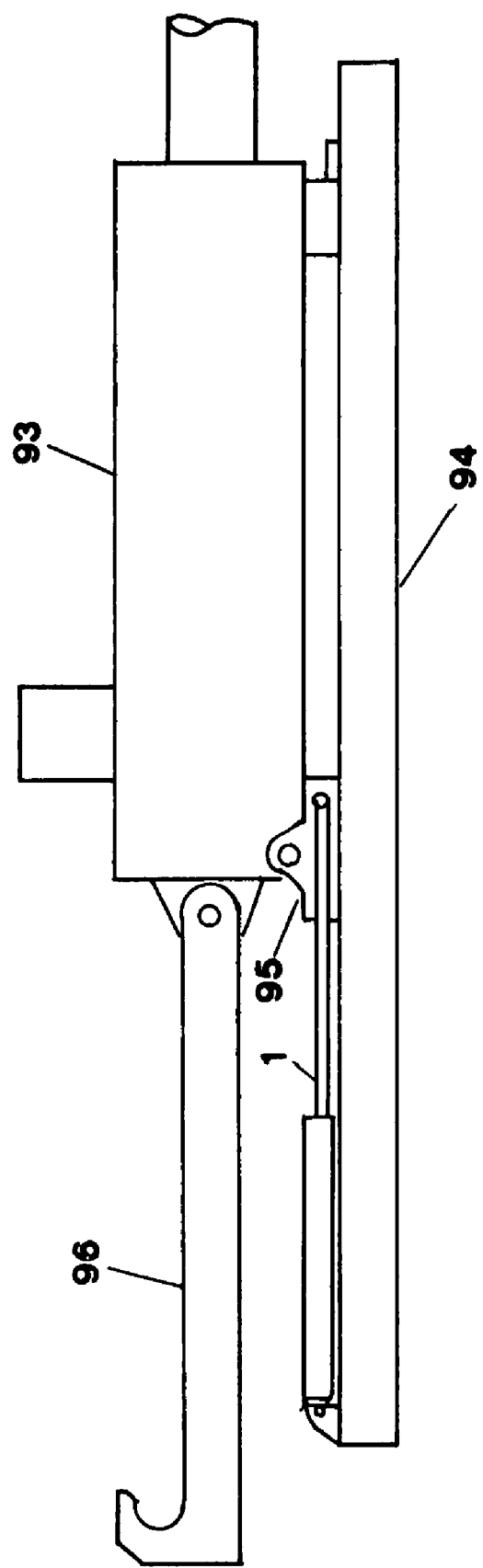
FIG. 1 shows an elevation of a typical PLET with the constant-thrust device inserted between the mud mat and the foundation, integrated with the sliding mechanism. A typical PLET contains the following elements generally present in an ordinary design without a CT device: pipe module component 93, mudmat component 94, sliding mechanism between pipe module and mudmat component 95, and yoke/hook component 96. A locking pin and rear shoe may also be part of the sliding mechanism.
Figure 2:
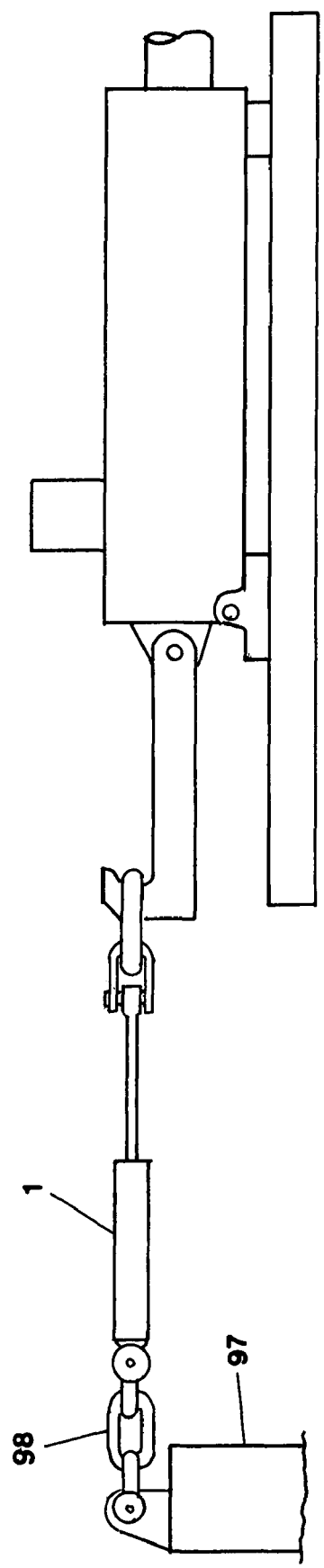
FIG. 2 shows the CT device placed in the rigging, component 98, between a PLET yoke/hook and a separately installed foundation pile, component 97.
Figure 3:
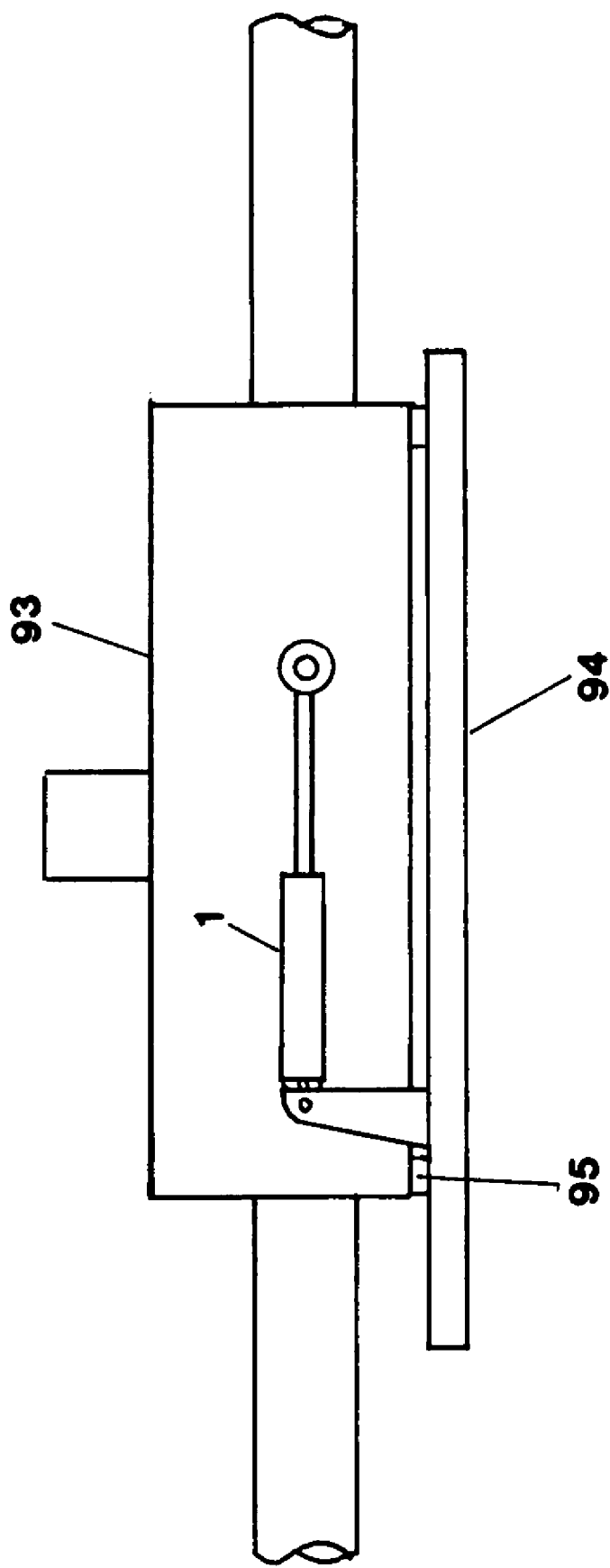
FIG. 3 shows an elevation of an inline sled with the constant-thrust device inserted between the pipe and the mudmat. This is a typical inline sled provided to support a tie-in or valve along the route. Inline sleds do not usually include a mechanism for longitudinal sliding; but, to allow insertion of a CT device, the pipe module structure must be separated from the mudmat by a sliding mechanism.
Figure 4:
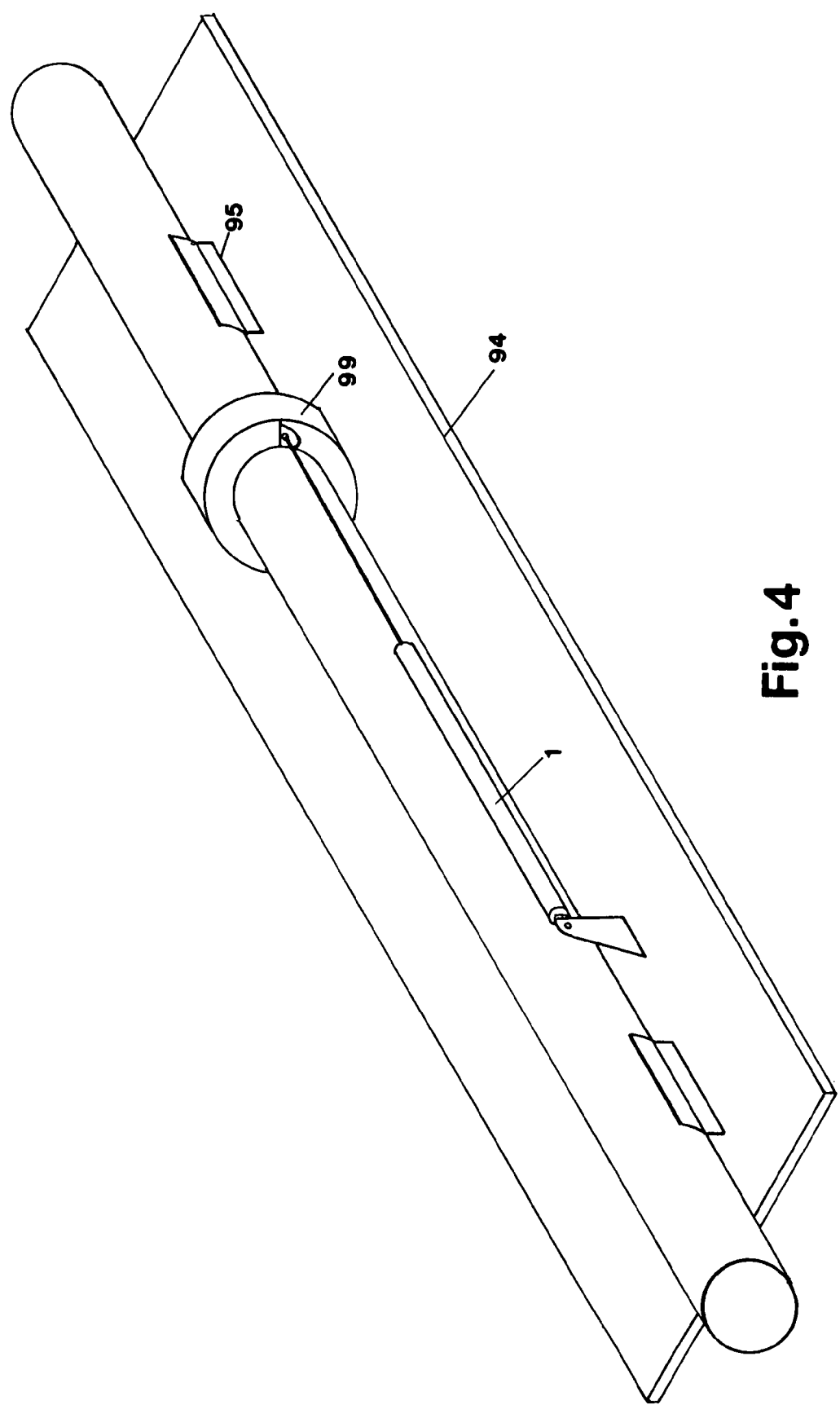
FIG. 4 shows an elevation of an inline mudmat and CT device when no tie-in or valve is required. In such case, the pipe must have a thickened section, sleeve or collar, component 99, to allow attachment of the CT device to the pipeline without overstressing the pipe. The pipe must be free to move longitudinally relative to the mudmat, supported on saddles or guided shoes, forms of a sliding mechanism.

The invention is a means to eliminate thermal walking of a submarine pipeline by applying a near constant pre-specified axial force, typically with a constant-thrust device suitable for deepwater deployment.

In the preferred embodiment the application of a near constant force is achieved using a piston-in-cylinder or equivalent arrangement in which the chamber is evacuated or contains gas at a pressure that is negligible compared to the hydrostatic pressure in the depth of water in which it will reside, and in which the driving force is provided by the external pressure of the ambient ocean water. In practice, one atmosphere fulfils the negligible internal pressure requirement for a deepwater installation. The area of the piston is sized based on the external hydrostatic pressure to produce the correct required longitudinal load. For an evacuated cylinder, the pressure differential will remain constant irrespective of stroke. If the chamber is left with one atmosphere, this gas will compress through the stroke, however the pressure and pressure change will still be small compared to the unchanging external pressure and thus the total will be close to constant.

The invention is described initially for walking caused by thermal transients progressing along the pipeline, then expanded to other drivers resulting in asymmetrical movement. The location, deployment, and use of a constant-thrust device will depend largely on the force level to be achieved. Whether used at a pipeline end with a PLET or along the route with an inline sled is a matter of convenience and competing demands of the subsea architecture. When the thrust required is moderate, as with a PLET for very short lines, the constant-thrust device would preferably be interposed between the sliding unit of the PLET and the PLET's foundation part. For higher longitudinal loads that challenge foundation stability, the constant-thrust device would be interposed between the PLET sliding portion and the fixed point on a pile or similar anchor external to the PLET. In that case it can be part of the pile top itself, or included in the rigging between the pile and PLET, or embedded in the hook/yoke. The constant thrust eliminates cyclically reversing loading to the foundation as well as reducing its magnitude.

During installation of a standard PLET, the sliding portion is locked in position, usually the cold and unpressured position, and released only after the PLET is on-bottom and the continuing pipeline is laid. The same is the case when utilizing a constant-thrust device. If utilizing a cylinder type constant-thrust device, when the PLET is on the lay vessel, the gas within the cylinder will equalize with the external atmosphere if left at atmospheric pressure or close to it and thus the piston will not be energized and the sliding portion of the PLET will be in a neutral position. Similarly, if the cylinder is evacuated, the pressure difference and thrust generated will be small and will not overcome the friction in the PLET sliding mechanism. Once the PLET is on-bottom, the hydrostatic pressure of the seawater will load the piston, thus the locking mechanism must be able to release in a controlled manner, as the sliding portion will attempt to move forward and begin stretching the adjacent length of pipe. This can easily be done using a two-chamber CT device, and opening a flooding valve to the pressure-side.

Some longitudinal pipeline expansion occurs during hydrotest of the pipelines. When hot fluid is introduced into the pipe, the sliding portion of a CT equipped PLET will accommodate the thermal expansion of the pipeline, as it would on a non-CT PLET; however, the constant tension imposed at the end will cause a slightly larger expansion to occur than in the untensioned case. In this way, the tendency to walking is balanced.

Similar considerations apply to restraints applied along the pipeline route rather than at the ends. Analogous to PLET ends, the constant-thrust device may be inserted between the sliding and stationary components of an inline sled or between a point on the pipeline that moves relative to an external anchor that is stationary. If an inline sled is already required for independent reasons such as support of a heavy component or restraint of torsion, it can serve to also provide longitudinal restraint. Since inline sleds usually do not slide relative to their pipelines, a sliding mechanism must be included to decouple the pipeline longitudinally from its foundation to allow insertion of a constant-thrust device between them.

A second application is for a pipeline that traverses changing grade, especially if most of this grade change is concentrated in one location. Walking may be caused by modest grade change, which produces a small consistent and calculable downward vector that can be equilibrated by constant tension restraint. For shallow gradients the tensile restraint needed is small and may be accommodated by any of a variety of constant-thrust devices.

A further application is to absorb the bottom tension due to a catenary riser. In many cases it is desirable to absorb only the force applied by the catenary under normal operating condition when start-up is likely to occur, rather than extreme storm conditions when the pipeline is likely to have been shut in. This load is easily and consistently calculable. A fixed restraint would be loaded to the highest load caused by displacement of the floating structure from which the riser is supported rather than the much lower load when the structure is in its centered position. A constant-thrust device can be preset to resist only the much lower tension at operating level, again allowing elimination of a pile in many cases and drastically reducing its size in the others.

I claim:

1. A method for a pipeline system for restricting global axial movement due at least in part to thermal and/or pressure cycling of a pipeline of the pipeline system, wherein the pipeline system comprises: a) the pipeline supported at points, intervals or continuously in one or both of transverse directions of the pipeline by a medium that applies resistance against the pipeline in a longitudinal direction of the pipeline during longitudinal movement of the pipeline relative to the medium at one or more locations of support for the pipeline, b) a foundation element available to react load from the pipeline in the longitudinal direction of the pipeline, c) a connection point at an end or along a length of the pipeline, d) a connection point to the foundation element, e) and a pipeline end termination or an inline sled, wherein the pipeline end termination or the inline sled comprises: at least a longitudinally sliding pipe module attached to and moving with the pipeline and a nonmoving element attached to the foundation element or to a stationary foundation integral with the pipeline end termination or the inline sled and integral with attachment points on both the longitudinally sliding pipe module and the foundation element, wherein the pipeline system is subjected to cycles of at least either temperature change or high internal pressure, the method comprising a. interposing via the attachment points a constant-thrust device between the longitudinally sliding pipe module and the foundation element or the stationary foundation of the pipeline end termination or the inline sled; and b. applying a constant force in line with a longitudinal axis of the pipeline throughout the thermal and/or pressure cycling between the connection point at the end or along the length of the pipeline and the connection point to the foundation element, wherein the foundation element is capable of reacting load in the longitudinal direction of the pipeline.

2. A method for a pipeline system for restricting global axial movement due at least in part to thermal and/or pressure cycling of a pipeline of the pipeline system, wherein the pipeline system comprises: a) the pipeline supported at points, intervals or continuously in one or both of transverse directions of the pipeline by a medium that applies resistance against the pipeline in a longitudinal direction of the pipeline during longitudinal movement of the pipeline relative to the medium at one or more locations of support for the pipeline, b) a foundation element available to react load from the pipeline in the longitudinal direction of the pipeline, c) a connection point at an end or along a length of the pipeline, d) a connection point to the foundation element, e) a pipeline end termination or an inline sled that moves with the pipeline or includes a longitudinally sliding pipe module attached to and moving with the pipeline, and f) a stationary foundation structure separate from but accessible to the pipeline end termination, the inline sled, or the pipeline, wherein the pipeline system is subjected to cycles of at least either temperature change or high internal pressure, the method comprising:

a. interposing a constant-thrust device between the pipeline and a fixed point on the stationary foundation structure separate from the pipeline end termination, the inline sled, or the pipeline; and b. using the constant-thrust device to: apply a constant force in line with a longitudinal axis of the pipeline throughout the thermal and/or pressure cycling of the pipeline, and between the connection point at the end or along the length of the pipeline and the connection point to the foundation element, wherein the foundation element is capable of reacting load in the longitudinal direction of the pipeline.

3. The method of claim 2, further comprising:

a. interposing the constant-thrust device in rigging between the pipeline end termination, the inline sled, or the pipeline and the fixed point on the stationary foundation structure, or interposing a multiplicity of constant-thrust devices in the rigging between the pipeline end termination, the inline sled, or the pipeline and the fixed point on the stationary foundation structure; and b. using the constant-thrust device or the multiplicity of constant-thrust devices to: apply the constant force in line with the longitudinal axis of the pipeline throughout the thermal and/or pressure cycling of the pipeline, and between the connection point at the end or along the length of the pipeline and the connection point to the foundation element, wherein a vector sum of action of the multiplicity of constant-thrust devices is directed along the longitudinal axis of the pipeline.

* * * * *